United States Patent [19]

Allen

[11] Patent Number: 5,218,984
[45] Date of Patent: Jun. 15, 1993

[54] MEANS AND METHOD FOR NOISE AND CAVITATION ATTENUATION IN BALL-TYPE VALVES

[76] Inventor: Ernest E. Allen, 1149 - 230th St., State Center, Iowa 50247

[21] Appl. No.: 891,443

[22] Filed: May 29, 1992

[51] Int. Cl.⁵ .............................................. F16K 47/04
[52] U.S. Cl. .................................. 137/1; 137/625.31; 251/127
[58] Field of Search ...................... 137/625.31, 625.32, 137/1; 251/118, 121, 127

[56] References Cited

U.S. PATENT DOCUMENTS

| | | | |
|---|---|---|---|
| 3,776,278 | 12/1973 | Allen | 137/625.38 |
| 3,826,281 | 7/1974 | Clark | 251/127 X |
| 4,212,321 | 7/1980 | Hulsey | 137/625.32 |
| 4,364,415 | 12/1982 | Polon | 137/625.32 |
| 4,479,510 | 10/1984 | Bey | 137/625.31 |
| 4,530,375 | 7/1985 | Bey | 137/625.32 |
| 4,540,025 | 9/1985 | Ledeen et al. | 137/625.32 |
| 4,610,273 | 9/1986 | Bey | 137/625.32 |
| 4,691,894 | 9/1987 | Pyötsiä et al. | 251/127 |
| 4,774,984 | 10/1988 | Peters | 251/127 X |
| 4,889,163 | 12/1989 | Engelbertsson | 137/625.32 |
| 5,070,909 | 12/1991 | Davenport | 137/625.32 |

FOREIGN PATENT DOCUMENTS

1128489  7/1982  Canada.
0123408 10/1984  European Pat. Off. .

Primary Examiner—John Rivell
Attorney, Agent, or Firm—Zarley, McKee, Thomte, Voorhees, & Sease

[57] ABSTRACT

An optional insertable feature to the trim or modulating member for ball-type valves limits the magnitude of fluid flow turbulence within the flow stream of the valve. This attenuates noise and cavitation caused by flow through the valve. The insert mounts into the interior of the trim member and presents two intersecting apertured surfaces. The apertures or holes are specially shaped, sized, and spaced to maximize flow efficiency and minimize fluid turbulence as a result of flow through ball-like valves. The size and orientation of the surfaces are such that they restrict and partition fluid flow through the valve to varying degrees at varying valve openings. Virtually all fluid is partitioned by being directed through the apertured plates during approximately the first 50 percent opening of the valve to minimize noise and cavitation, while insuring that the flow characteristic is a monotonic function between valve capacity and valve opening.

20 Claims, 8 Drawing Sheets

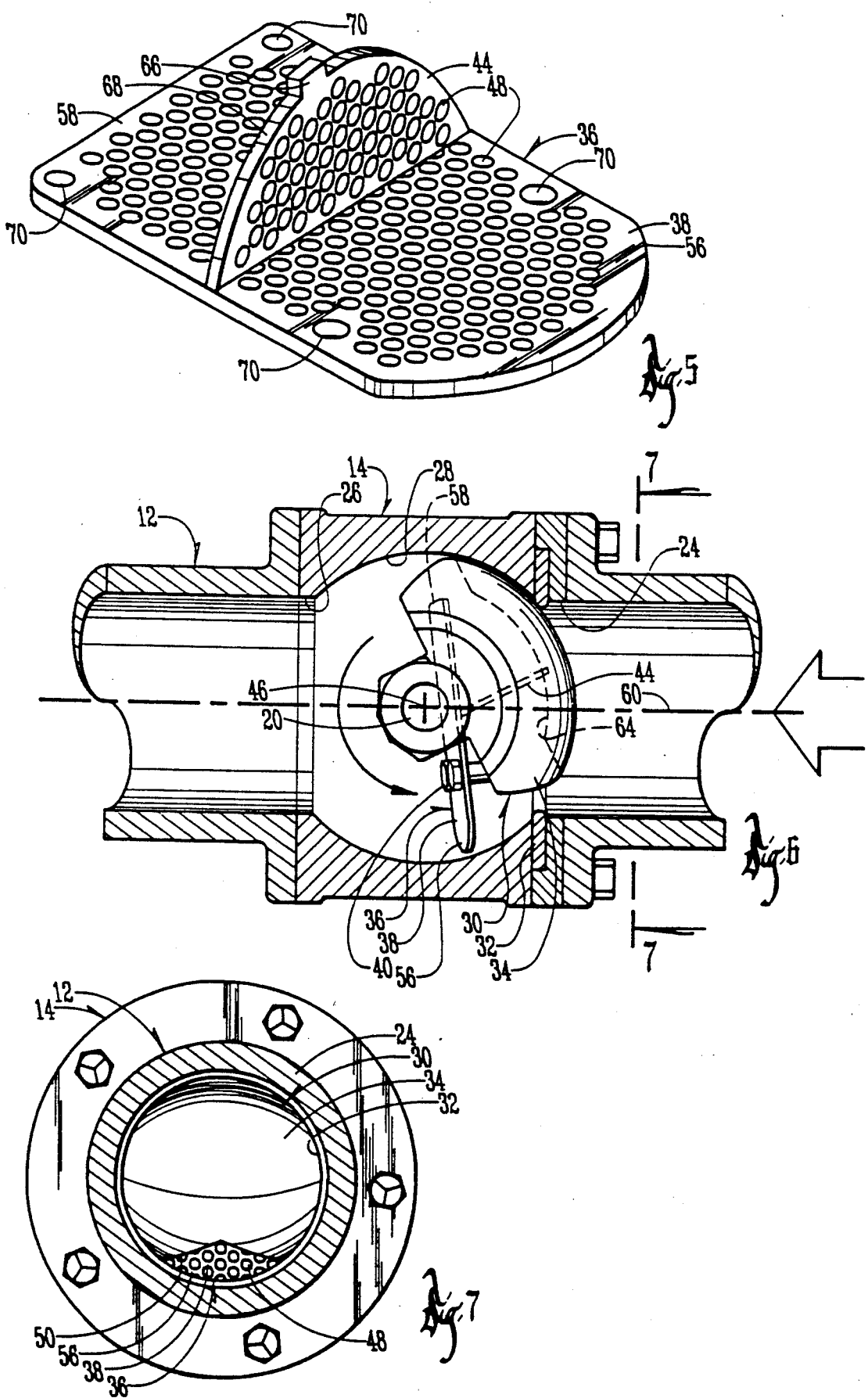

--- QUICK OPENING
— LINEAR
--- MODIFIED EQUAL PERCENTAGE

MEANS AND METHOD FOR NOISE AND CAVITATION ATTENUATION IN BALL-TYPE VALVES

BACKGROUND OF THE INVENTION

A. Field of the Invention

The present invention relates to fluid valves, and in particular, to noise and cavitation control for ball-type fluid control valves.

B. Problems in the Art

The control of flow of gas and liquids under pressure generally requires some type of valve. There are a variety of types of these flow restriction devices. An example is what will be called a ball-type valve.

Ball-type valves are well known in the art. They can take many different forms. Some of the predominant types are called full-ball, restricted ball, and segmented ball valves.

In each instance, a flow path extends through a valve housing for the ball-type valve. A ball element (full, restricted, or segmented) is rotatable within the housing to block all, a portion, or essentially none of the flow path. As a result, fluid flow through the pathway and valve is controlled.

Ball-type valves are used in many applications. In certain applications, however, problems exist. One example is what will be called the noise problem. Particularly during the first fifty percent or so of opening of a ball valve, fluid stresses and fracture interaction from entering the restriction presented by the valve create acoustic energy or noise. In some instances this noise, if not controlled, is of such a level that it can cause physical damage to the valve and adjacent piping; as well as structures in the proximity of the valve. Moreover, noise of higher levels (for example, over 90 dB) can cause physical injury to humans. Additionally, government regulations cover some valve uses and require attenuation of noise below a certain level.

One attempt to control this noise utilizes essentially a muffler system. Noise is attempted to be muffled in the sense of isolating and insulating the valve, or by placing mufflers down stream from the valve in the fluid flow line. These type of devices are relatively costly and can take up substantial amounts of space.

Other attempts have utilized what will be called baffles or inserts into the ball valve itself. Examples of these type of devices can be seen in the following patents:

| Patent No. | Inventor | Issue Date |
| --- | --- | --- |
| 4,212,321 | Hulsey | Jul. 15, 1980 |
| 4,364,415 | Polon | Dec. 21, 1982 |
| 4,479,510 | Bey | Oct. 30, 1984 |
| 4,530,375 | Bey | Jul. 23, 1985 |
| 4,540,025 | Ledeen et al. | Sep. 10, 1985 |
| 4,610,273 | Bey | Sep. 9, 1986 |
| 4,889,163 | Engelbertsson | Dec. 26, 1989 |
| 5,070,909 | Davenport | Dec. 10, 1991 |
| 1,128,489 | Canadian Patent | |
| 0,123,408 | European Patent | |

These attempts at noise reduction or attenuation have certain deficiencies. First, they have limited impact on noise reduction. Many also severely restrict fluid flow or adversely effect flow characteristics of the valve. Structural soundness, strength, and durability problems can also exist.

A second problem with ball-type valves is the potential for incipient cavitation or turbulence. Such cavitation occurs in ball-like valves at relatively low opening positions (generally less than 50 percent) as a result of flow separation occurring caused by the high velocity of liquid past the leading edge of the flow pathway bore through the ball trim element. If such flow separation occurs, vapor bubbles form. Cavitation can be severe enough that it physically damages the valve. For reasons similar to the noise problem, attempted solutions to cavitation problems have not been entirely satisfactory.

It is important to emphasize that any attempts to control noise or cavitation which effect the flow characteristic of the valve can be troublesome. It is generally desired, if not required, that a monotonic relationship exist between the percentage of valve opening and the percentage of maximum flow through the valve. In other words, for each incremental increase or decrease in opening of the valve, it is generally desired that there be an increase or decrease in flow capability through the valve.

It is obvious that if a noise or cavitation control device severely restricts flow or presents an undesirable flow characteristic for the valve, that the utility of the valve may be severely diminished. It is therefore important, and a problem in the art, to achieve required flow and maintain the desired flow characteristics when attempting to attenuate and control noise and cavitation.

It is therefore a primary object of the present invention to provide a noise and cavitation control ball-type valve trim element which improves over the state of the art.

It is an object of the invention to provide a trim element as above described which can be used in a variety of ball-type valves where noise or cavitation can be a problem.

Another object of the invention is to provide a trim element as above described which efficiently and economically provides acceptable noise levels.

A still further object of the invention is to provide a trim element as above described which provides acceptable noise levels while maintaining desired flow characteristics through the valve.

A still further object of the invention is to provide a trim element as above described which is effective in dealing with situations where cavitation is a problem while maintaining desired flow characteristics for the valve.

Another object of the present invention is to provide a trim element as above described which has a non-complex structure that can be used to solve, diminish, or reduce complex noise or cavitation problems.

Another object of the present invention is to provide a trim element as above described which is economical to manufacture and install, and is durable and easy to maintain.

Another object of the present invention is to provide a trim element as above described which allows operation of ball-type valves at higher differential pressures with minimum potential of cavitation damage.

A still further object of the invention is to provide a trim element as above described which minimizes adverse effect on flow capacity or characteristic of the valve.

These and other objects, features, and advantages of the present invention will become more apparent with reference to the accompanying specification and claims.

SUMMARY OF THE INVENTION

The present invention involves a means and method for addressing noise and cavitation problems in ball-type valves. Both noise and cavitation problems are addressed by partitioning fluid flow through the valve, particularly during the first 50 percent opening of the valve. Partitioning is accomplished by causing the large cross-section of fluid flow through the valve opening to pass through a plurality of substantially smaller apertures. Essentially a large pressurized jet of fluid is divided or partitioned into many small jets.

The invention forces virtually all of the fluid flow through at least one flow partitioning structure during the first part of opening of the valve. Fluid flow through at least one flow partitioning structure is continued when the valve is anywhere between slightly open and approximately 50% open. However, when over 50% open, fluid flow through the partitioning device is diminished and unrestricted flow area through the valve is increased.

The flow partitioning occurs relatively immediately down stream from the leading edge of the trim element. Flow partitioning also is configured to minimally impact upon the flow characteristic of the valve. Although a reduction in flow capacity is a consequence of the invention, it is substantially less severe than some of the other prior art attempt and generally provides acceptable flow capacity. Furthermore, it effectively attenuates noise and turbulence and does not adversely effect flow characteristics of the valve, which is an important consideration.

The present invention accomplishes these advantages by incorporating a partitioning insert to the trim element of the ball valve. The insert is configured to be structurally sound and durable, even in the environment of very high pressures and forces. The partitioning initially occurs essentially immediately downstream from the leading edge of the trim element and the insert is positioned and configured so that it presents increasing flow area with increasing travel of the trim element. Partitioning of virtually all fluid flow is accomplished through the first approximate 50 percent opening of the valve. Thereafter, some unrestricted unportioned flow area is presented to a portion of the fluid. The valve, therefore, does restrict some flow capacity, but after needed major noise and cavitation control through the first approximately 50 percent opening of the valve, some unrestricted flow area is presented. The valve therefore accomplishes good noise and cavitation control with acceptable impact on flow capacity.

The invention therefore attenuates noise and cavitation of the valve in an economical, non-complex, and durable manner. The invention is applicable to ball-type valves such as full ball, restricted ball and segmented ball valves, or analogous valves.

BRIEF DESCRIPTION OF THE DRAWINGS

FIG. 5 is an enlarged perspective view of a noise and cavitation control insert according to the preferred embodiment of the invention, such as is shown in FIG. 3 installed into a segmented ball trim element.

FIG. 6 is a sectional view similar to FIG. 2 except that it shows the trim element in a slightly opened position as compared to the completely closed position of FIG. 2.

FIG. 7 is a sectional view taken along line 7—7 of FIG. 6.

DETAILED DESCRIPTION OF THE PREFERRED EMBODIMENT

Figure 1:
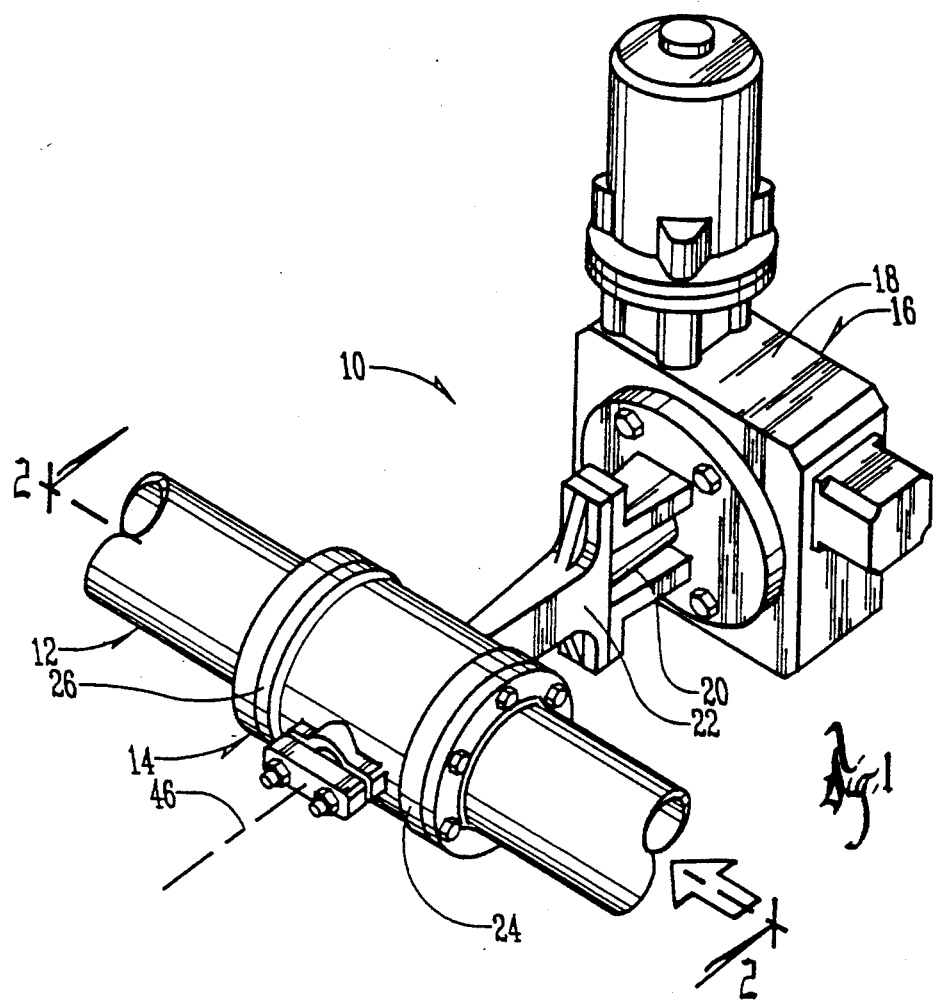
FIG. 1 is a perspective view of a ball-type valve assembly installed in a fluid pipe.

To assist in a better understanding of the invention, a detailed description of the preferred embodiment will now be set forth. It is to be understood that this describes but one specific form the invention can take, and that others are possible.

The appended drawings will be referred to in this description. Reference characters in the form of numbers or letters are used in the drawings to indicate certain parts and locations in the drawings. The same reference characters will be used throughout the drawings to indicate the same parts or locations unless otherwise indicated.

A brief overview of the preferred embodiment and the particular environment for this example of the invention will be given. A specific description of the structure of the preferred embodiment will follow. Thereafter, a discussion of how the structure functions in its working environment will be set forth. Finally, operational matters and features, as well as alternative embodiments, will be discussed.

A. OVERVIEW

By referring to FIG. 1, a ball valve assembly 10 is shown as installed along pipeline 12. Assembly 10 consists of valve housing 14 and valve actuator 16.

Assembly 10 can be any one of a variety of types of ball valves. In the preferred embodiment it is a Vee-Ball rotary control valve available from Fisher Controls Company, Marshalltown, Iowa 50158.

Such valves can be used for a variety of different purposes. Examples are controlling on energy-related tasks such as in the chemical, petrochemical, and hydrocarbon energy industries. Other examples are uses in the power generation, boiler control and energy management, pulp and paper, and other manufacturing and processing fields and industries.

As is obvious, such valves can be large and small, and can be used to control small, low pressure fluid flow, or large, high pressure, high flow rate fluid flow. In the example of the preferred embodiment, fluids are at relatively high pressures through pipeline 12.

Valve actuator 16 consists of a drive 18 which is connected through gearing to the valve stem 20 (see also FIG. 2) inside stem housing 22. By operation of drive 18, stem 20 is rotated which in turn can rotate a trim or modulating element inside valve housing 4 which serves to open or close, or restrict to varying degrees, flow area between inlet 24 and outlet 26 of valve housing 14.

Figure 2:
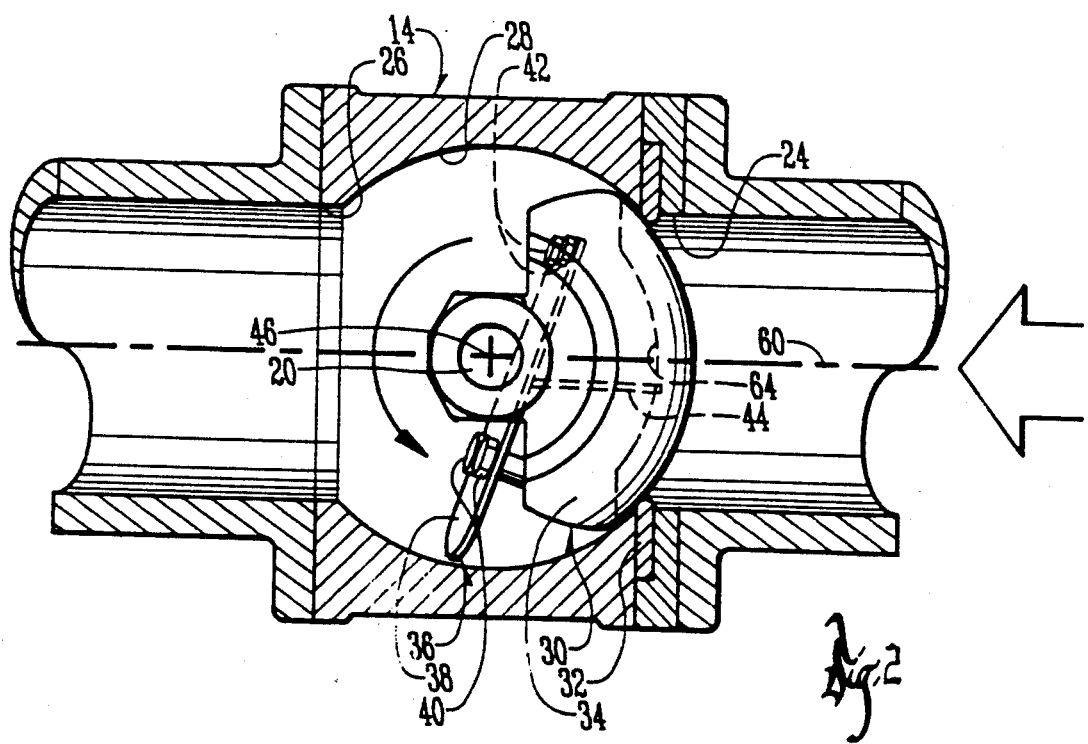
FIG. 2 is an enlarged sectional view taken along line 2—2 of FIG. 1 and shows a segmented ball valve according to a preferred embodiment of the invention.

FIG. 2 illustrates in cross sectional and enlarged fashion the interior of valve housing 14. Spherical chamber 28 exists between inlet 24 and outlet 26. What is called the trim or modulating element 30 in the preferred embodiment is a segmented ball which is connected to stem 20. Segmented ball 30 can be rotated so that it completely and sealingly blocks off inlet 24 (as shown in FIG. 2), or rotated to varying degrees of opening (some examples shown at FIGS. 6-9), or to basically completely open (see FIGS. 10 and 11). Such is well known within the art. Segmented ball 30, in its closed state, seals off inlet 24 in cooperation with a seal or gasket 32. The convex or spherical face 34 of ball 30 also matingly conforms with the spherical surfaces defining chamber 28.

FIG. 2 additionally shows a noise and cavitation control or attenuation insert 36 according to the present invention. As will be explained in more detail below, insert 36 attaches to the interior of segmented ball 30 opposite from its convex face 34. Insert 36 consists of a first plate 38 mounted to segmented ball 30 by pairs of bolts 40 and 42, and a second intersecting plate 44 mounted between segmented ball 30 and first plate 38.

Insert 36 is rigidly mounted to ball 30 and therefore rotates with rotation of ball 30. Insert 36 becomes exposed to fluid flow only when ball 30 is moved from the completely closed position to some degree of opening.

B. STRUCTURE OF PREFERRED EMBODIMENT

Figure 3:
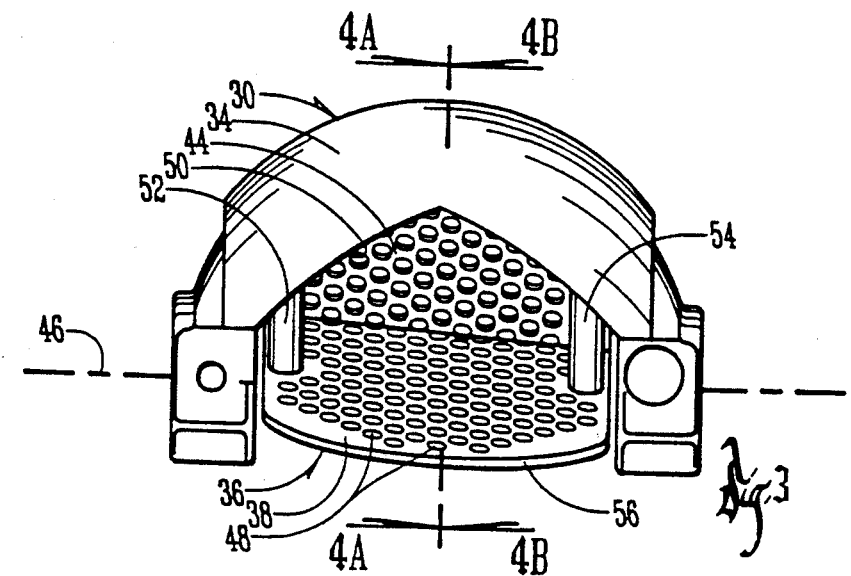
FIG. 3 is an enlarged isolated bottom plan view of the trim element of the segmented ball valve of FIG. 2.

The exact structure of insert 36 can be seen in more detail in FIGS. 3-5. FIG. 3 shows in enlarged fashion segmented ball 30 removed from valve housing 14. Axis 46 indicates the axis for stem 20 (not shown), and also indicates the rotational axis for ball 30. From this view it can be seen that both first and second plates 38 and 44 have a number of holes or apertures 48, that are specially shaped, sized, and spaced to maximize flow and minimize fluid turbulence. Therefore, the plates are permeable to fluid, but as is well known in the art, would somewhat restrict such flow. These holes 48 are what partition or divide fluid flow through the valve into many small jets.

FIG. 3 also shows that segmented ball 30 includes a V-shaped portion 50. Portion 50 allows for a controlled increase of flow opening area when the valve opens.

As will be discussed in more detail later, FIG. 3 also shows that first plate 38 is oblique to rotational axis 46. Leg 54 is longer than leg 52, which attach the front of first plate 38 to ball 30. Therefore, first plate 38 tilts downwardly from left to right in FIG. 3 as compared to axis 46.

Additionally, it is shown that first plate 38 is oblique to axis 46 from front to back in FIG. 3. In other words, the front edge 56 of first plate 38 is lower than the back edge 58 (see FIG. 5) when viewed from this orientation.

Figure 4A:
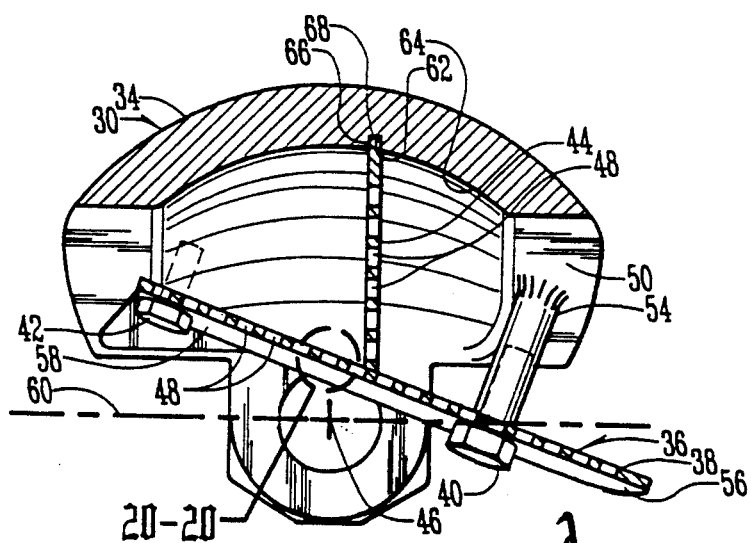
FIGS. 4A and 4B are opposite sectional views taken along lines 4A—4A and 4B-4B respectively of FIG. 3.
Figure 4B:
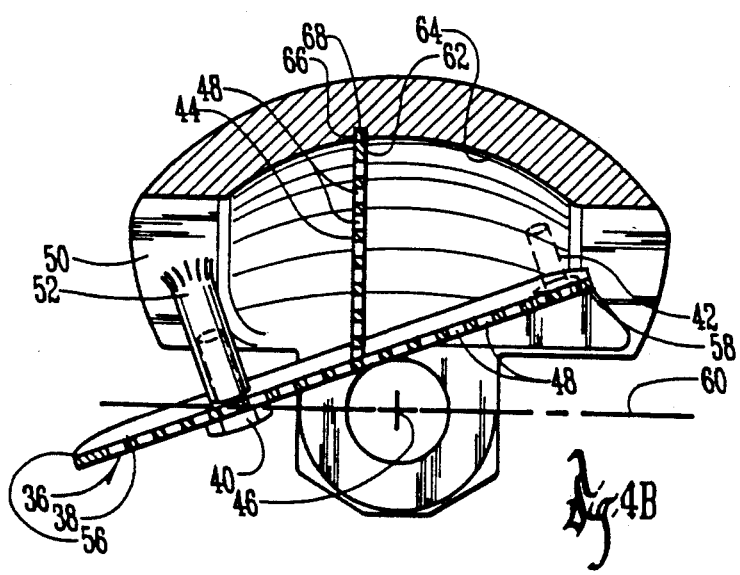

FIGS. 4A and 4B show basically mirror images of the interior of segmented ball 30 in sectional fashion. Axis 60 is basically taken through the center of the flow path through chamber 28 and intersects with the center of the rotational axis 46 for segmented ball 30. It therefore can be seen more clearly how first plate 38 is oblique to the general flow path through the valve; and is in fact oblique in more than one direction to the rotational axis and flow path.

Still further, FIGS. 4A and 4B clearly show that second plate 44 is in turn oblique to first plate 38. Second plate 44 intersects first plate 38 at an intermediate position between front and back edges 56 and 58. In the preferred embodiment, it is attached by conventional means (such as welding) at its lower end, and is secured to the interior surface of ball 30 by inserting tab 66 (see FIG. 5) into a notch 62.

It is to be understood that bolts 40 are threadably secured into threaded male bores in legs 52 and 54, whereas bolts 42 are threadably secured in threaded male bores into segmented ball 30 itself. Other means and methods of attachment or mounting of plates 38 and 44 to one another, and to ball 30 can be utilized. One example would be welding.

FIG. 5 shows insert 36 in enlarged isolation. Top edge 68 of second plate 44 matingly fits along the curved interior surface 64 of ball 30 Front edge 56 of first plate 38 is curved to matingly conform to the spherical shape of chamber 28. As can be seen in FIGS. 2, 6, 8 and 10, front or leading edge 56 closely conforms to the shape of chamber 28. FIG. 5 also shows holes 70 through which bolts 40 and 42 extend for attachment of insert 36.

It is to be understood that in the preferred embodiment, the number and size of apertures 48 is selected according to desire. The size and spacing, however, does create a ratio between open (permeable) areas and surface (non-permeable) areas for plates 38 and 44. By varying the ratio between fluid-permeable open area, and non-permeable surface area, flow characteristics of the particular valve can be varied.

In the preferred embodiment, for an approximately 5"×4 ⅛" first plate 38, there are approximately 12 to 16 of 3/16" diameter holes per square inch of surface area (approximately 40% open area). These sizes and numbers can change, of course, for varying effects or different applications.

C. OPERATION OF PREFERRED EMBODIMENT

FIG. 2 shows ball 30 in a sealingly closed position. No fluid would flow through valve chamber 28. FIGS. 6 and 7 show two views of ball 30 rotated so that V-shaped portion 50 just begins to appear at inlet 24. The valve is therefore just slightly open. As can be easily appreciated by referring to FIGS. 6 and 7, virtually all fluid entering chamber 28 will be partitioned by passing through insert 36.

Assuming the viewing angle of FIG. 7, fluid entering chamber 28 would not see anything but the first plate 38 and apertures 48. By referring to FIG. 6, as fluid would spread out through chamber 28, some would pass directly through apertures 48 and first plate 38, other fluid would pass upwardly through apertures 48 and second plate 44 and then either out apertures 48 near the back edge 58 of first plate 38 or travel around and over back edge 58 and out of chamber 28 into outlet 26.

In all instances, fluid must past either through first plate 38 or second plate 44. Therefore, all flow would be somewhat restricted.

It is to be further understood, that because first plate 38 is oblique to the rotational axis 46 of ball 30 in all respects, the fluid would never perpendicularly impact first plate 38.

Figure 8:
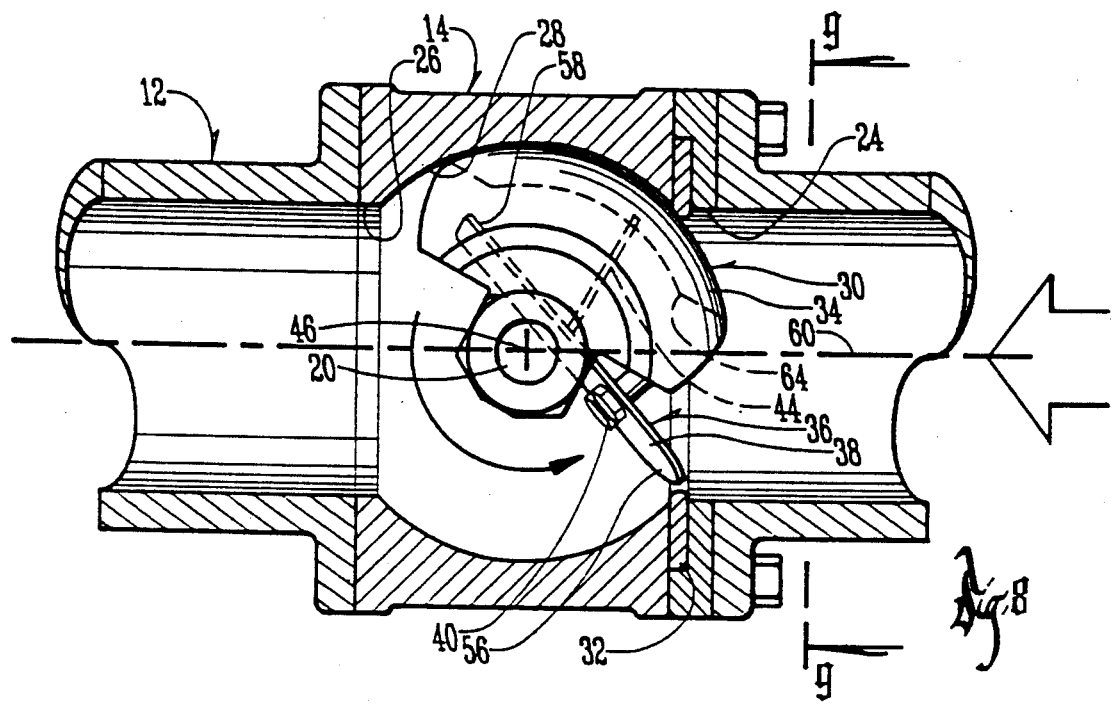
FIG. 8 is similar to FIGS. 2 and 6 except showing the trim element at approximately 45–50 percent open position.
Figure 9:
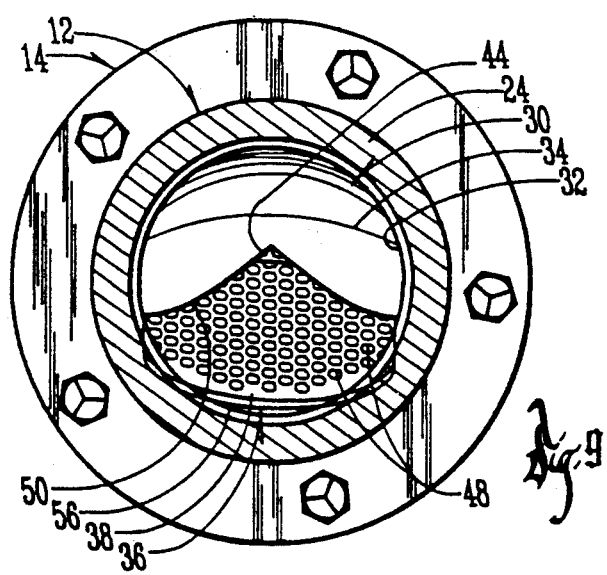
FIG. 9 is a sectional view taken along line 9—9 of FIG. 8.

FIGS. 8 and 9 show different views of ball 30 as rotated to approximately 45 to 50 percent open position. It is to be clearly understood that even in this position, as can be seen at FIG. 9, fluid entering through inlet 24 would see only first and second plates 38 and 44. Most of the fluid is forced to travel through at least one of those plates.

Note further that as shown in FIG. 9, when leading edge 56 of plate 38 enters inlet 24, its oblique or canted relationship allows some fluid (to the left) to pass under plate 38 unrestricted, and carries fluid to the right to pass through plate 38 (and/or plate 44). Importantly, as edge 56 moves in inlet opening 24, because it is oblique to the axis of rotation of ball 30, it presents increasing (or decreasing) flow area with increasing opening (or closing) travel of ball 30, and therefore does not create an undesirable flow characteristic for the valve.

Figure 10:
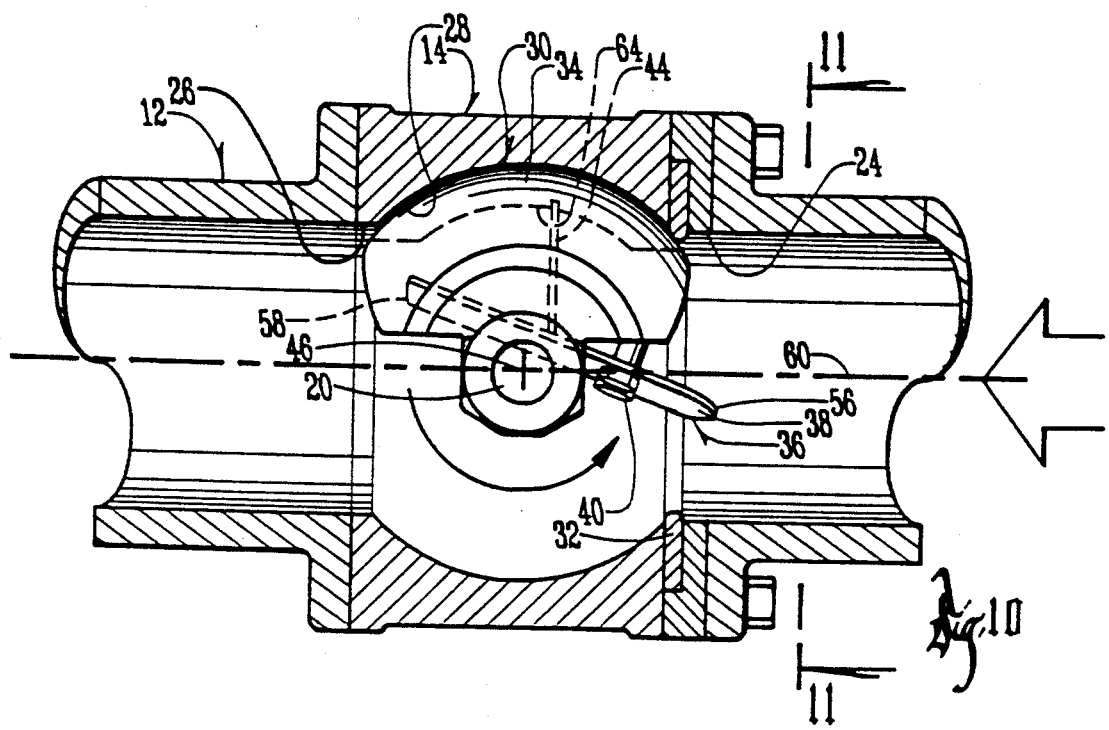
FIG. 10 is similar to FIGS. 2, 6 and 8 except showing the trim element in an almost totally open position.
Figure 11:
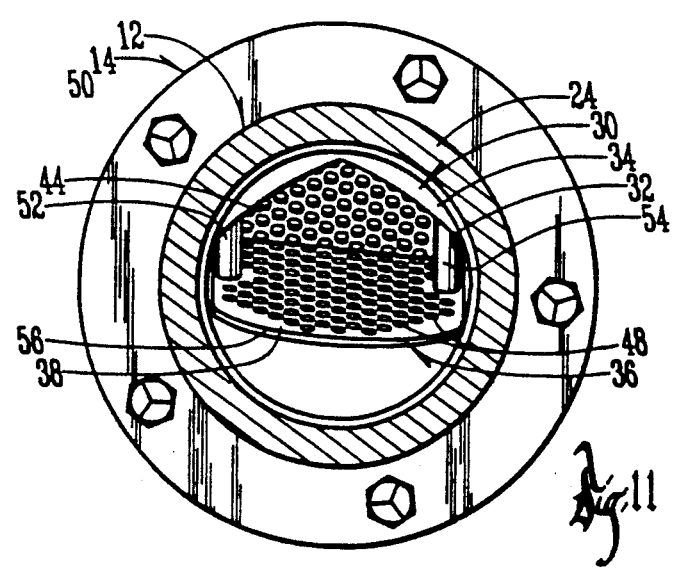
FIG. 11 is a sectional view taken along line 11—11 of FIG. 10.
Figure 12:
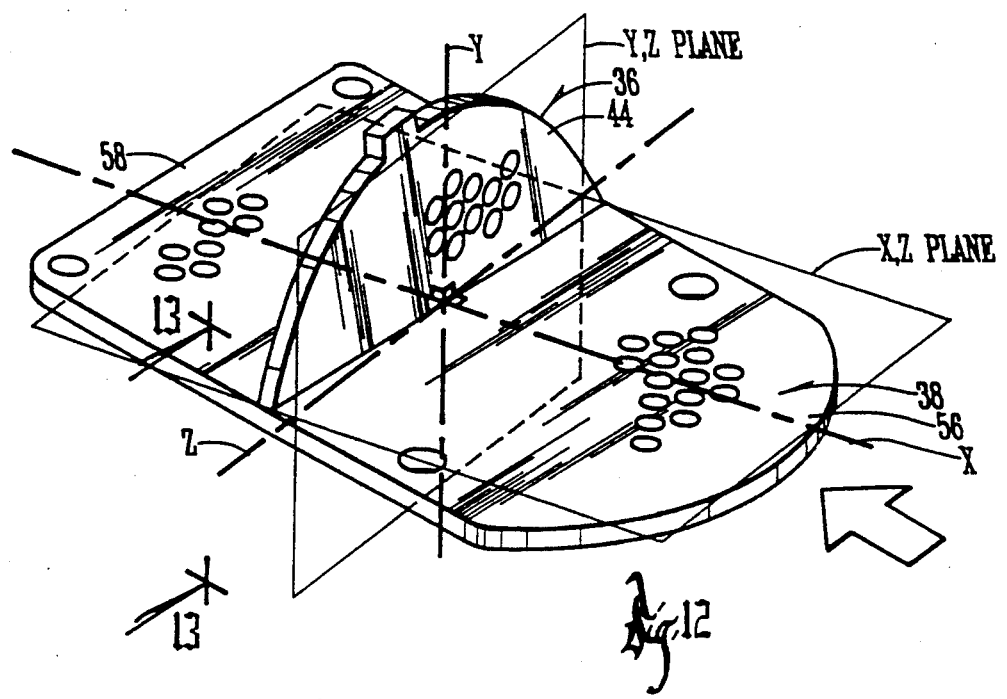
FIG. 12 is a diagrammatical view illustrating the angular orientation of sections of the noise and cavitation insert of FIG. 5 with respect to orthogonal planes.
Figure 13:
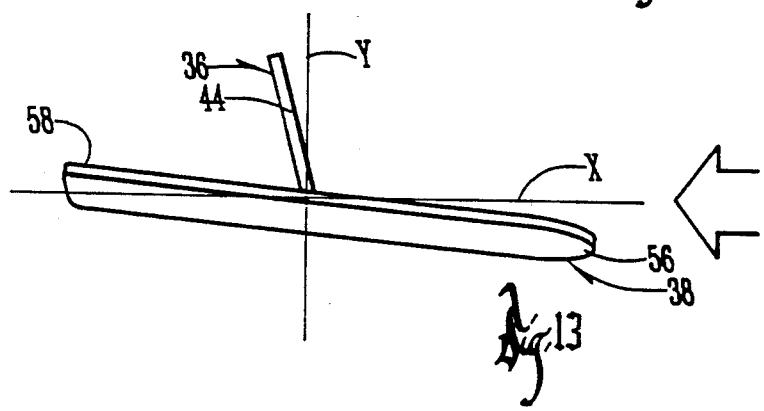
FIG. 13 is a reduced-in-size right side elevational view of FIG. 12.
Figure 14:
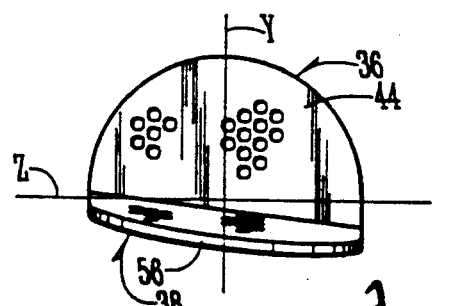
FIG. 14 is a reduced-in-size front elevational view of FIG. 12.
Figure 15:
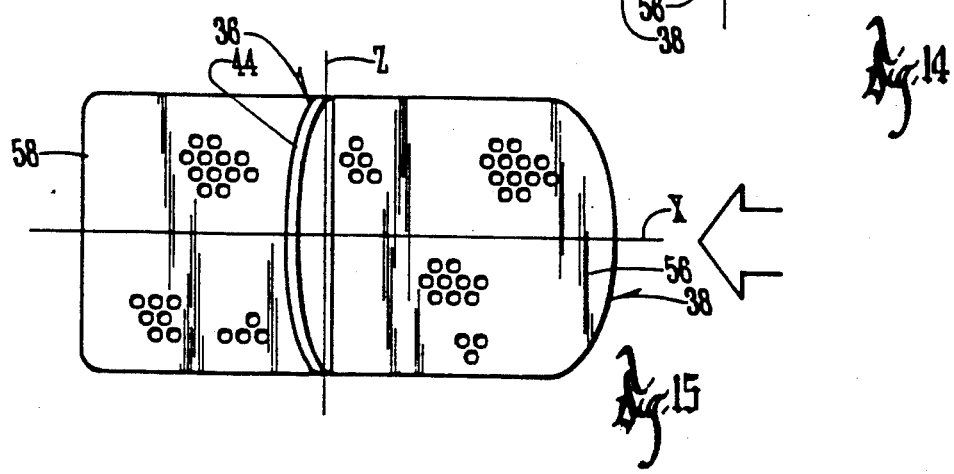
FIG. 15 is a reduced-in-size top plan view of FIG. 12.

FIGS. 10 and 11 then show ball 30 moved to almost totally open position. It can be seen that leading or front edge 56 of first plate 38 moves out of chamber 28 directly into the path of fluid flow through inlet 24 thereby opening up a substantial unrestricted flow area to the fluid beneath it. As can be seen clearly by FIG. 11, however, a substantially amount of the flow path through chamber 28 still passes through plates 38 and 44. In this position first plate 38 is somewhat near parallel with fluid pathway and second plate 44 is near transverse to fluid flow.

It is to be understood that in this configuration, up to 35 percent restriction of flow capacity is experienced. However, improved attenuation of noise and cavitation is achieved.

Moreover, the configuration of insert 36 is such that flow area is always increased through chamber 28 with incremental opening of ball 30. Therefore, the flow characteristic of this valve does not have undesirable characteristics.

FIGS. 12-15 more specifically illustrate how insert 36 of the preferred embodiment is configured. Orthogonal axes X, Y, and Z, which define planes XY, YZ, and XZ, are used to show how plates 38 and 44 are oblique to one another in several ways.

Figure 16:
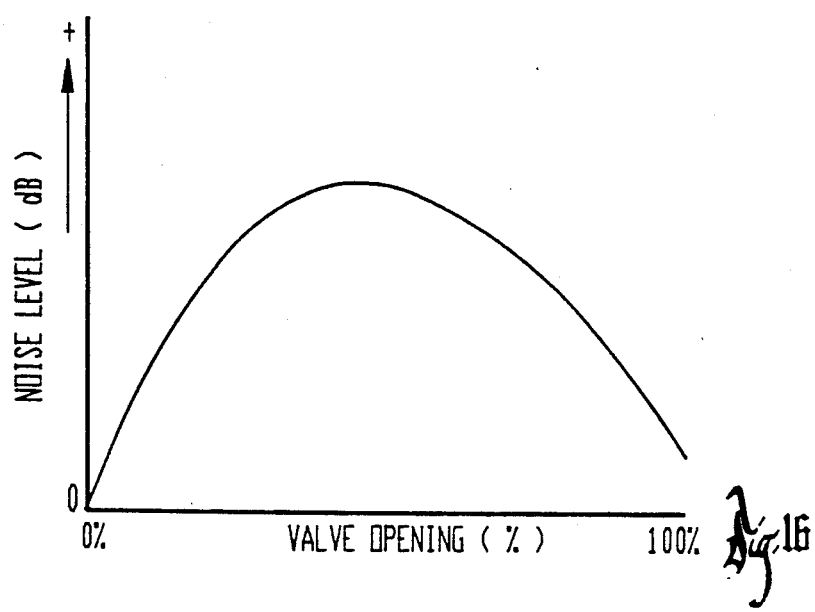
FIG. 16 is a graph illustrating noise as a function of valve opening for a typical ball-type valve without the noise and cavitation trim element of the preferred embodiment of the invention.
Figure 17:
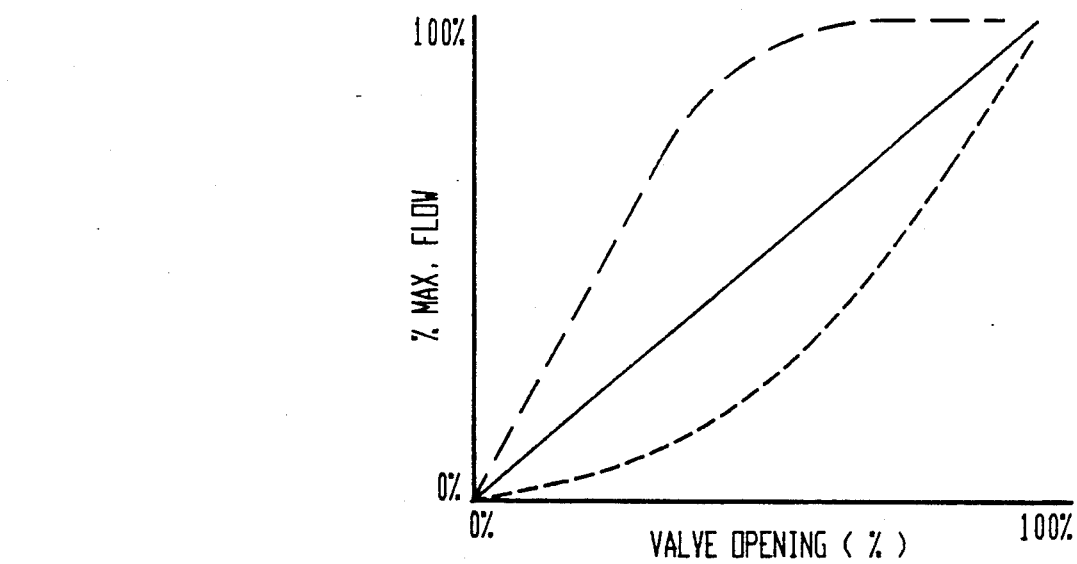
FIG. 17 is a graph showing typical flow characteristics for control valves.
Figure 18:
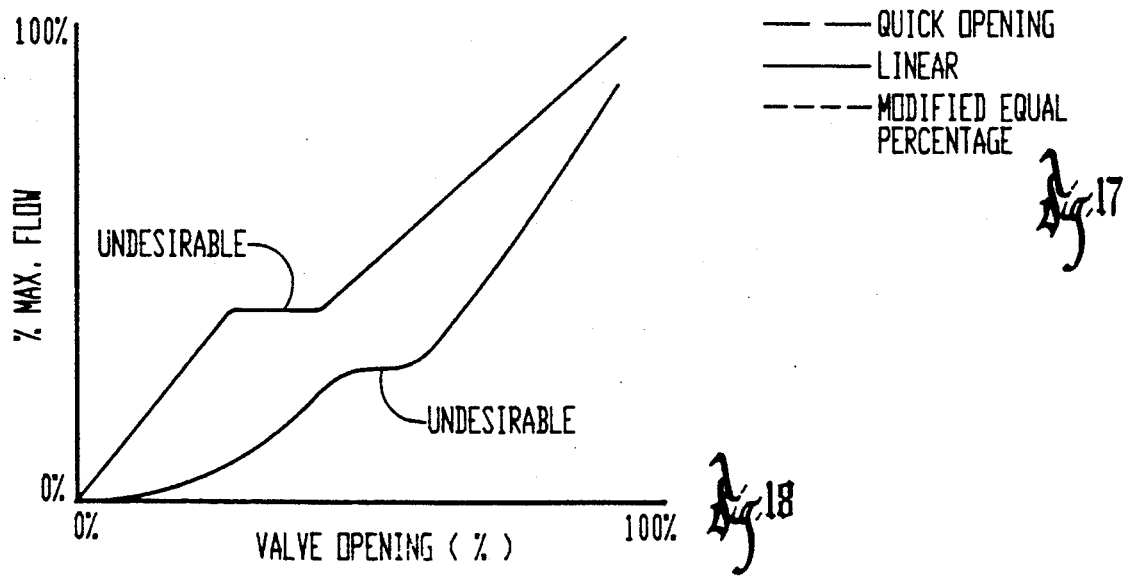
FIG. 18 is a graph showing undesirable flow characteristics for a control valve.

FIGS. 16-18 shows graphs relevant to the present invention. FIG. 16 shows that a substantial amount of noise is involved with the first approximately 50 percent of valve opening for conventional ball-type valves. Therefore, the present invention has been configured to concentrate on the first portion (first approximately 45 degrees) of opening of the valve. It is to be understood that when discussing the first approximately 45 degrees or 50 percent opening, this refers to both opening and closing the valve.

FIG. 17 shows several things. The linear line indicates a valve that would have a flow characteristic where each increment of valve opening would result in a linearly related increase in maximum flow capacity. Some quick opening valves, have a flow characteristic shown by the line labeled "quick opening." Even though the line is not linear, for each increment of valve opening, flow capacity does increase.

Other valves (including some according to the present invention with insert 36) have a flow characteristic such as the line labeled "modified equal percentage." Again, each increment of valve opening results in an increase in flow capacity.

The comparison, FIG. 18 shows that if flow devices are utilized where at some point or points the incremental increase in valve opening does not result in an increase in flow capacity, an undesirable result is obtained. This is shown by the flat points on the curves which leads to control problems and is simply not desirable for these types of valves.

The present valve has therefore again been designed, by its oblique relationships as previously discussed, to insure a monotonic function of valve capacity versus valve opening.

D. OPTIONS, ALTERNATIVES, AND FEATURES

Figure 19:
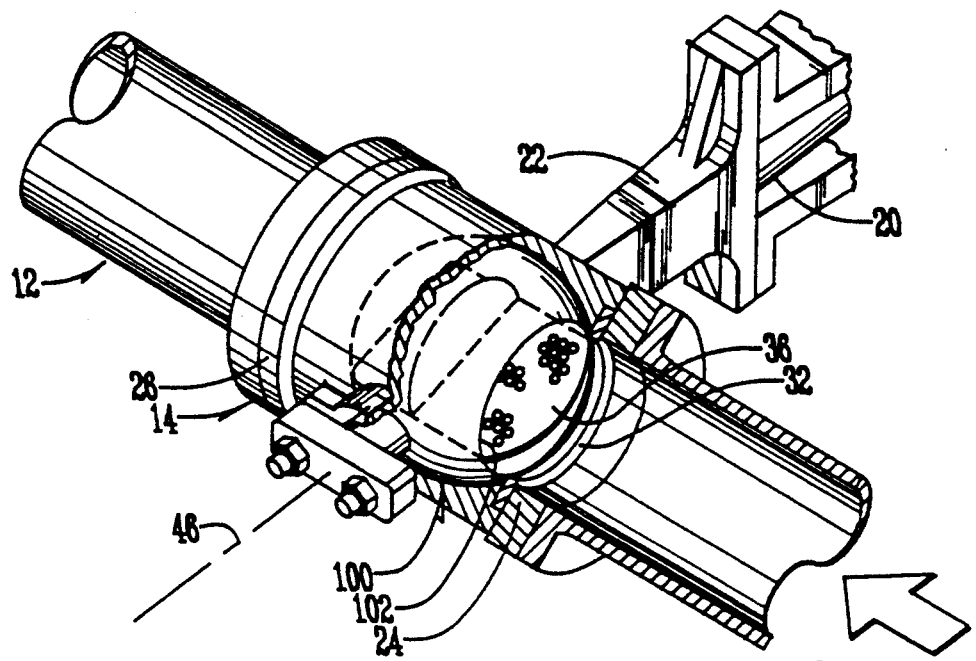
FIG. 19 is a diagrammatical perspective view of an alternative embodiment of the present invention as applied to a full ball or restricted ball trim element.

FIG. 19 in simplified diagrammatic form illustrates application of the present invention to a full or restricted ball trim element 100. The configuration is essentially similar to that described with the segmented ball 30. The difference is that a full or restricted ball trim element 100 basically is comprised of a spherical ball having a circular bore 102 therethrough. In this instance, insert 36 is simply attached inside bore 102 in as close an orientation with respect to the rotational axis through axle 20 and the flow path as is possible to the one described with respect to the segmented ball 30.

It is to be understood that insert 36 can take on many different forms and configurations as applied to such a trim element. Moreover, the invention is applicable to other trim elements for ball-type or analogous valves.

Figure 20:
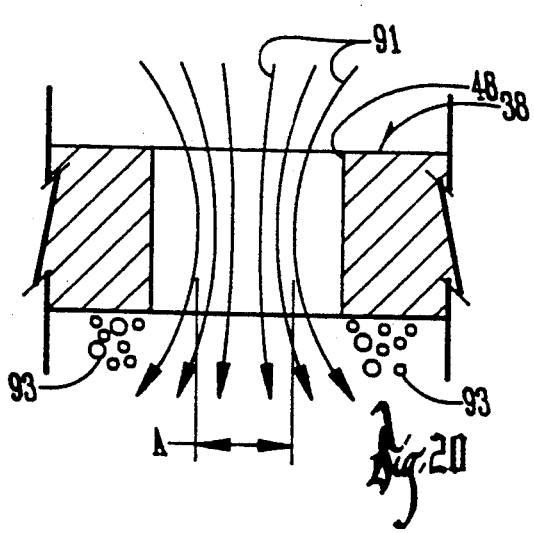
FIGS. 20-22 are enlarged sectional views, essentially taken from the perspective shown at line 20—20 of FIG. 4A, illustrating preferred shaping of apertures of the insert for the preferred embodiment of the invention.
Figure 21:
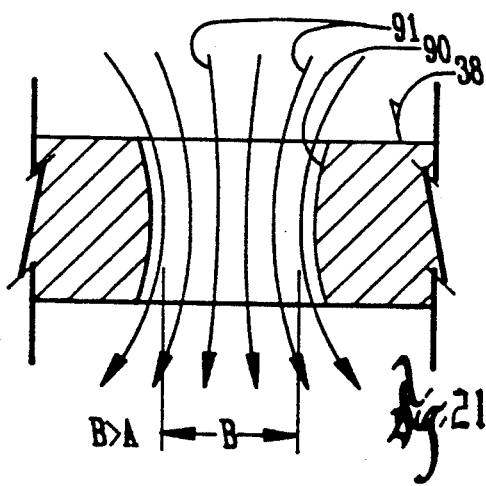
Figure 22:
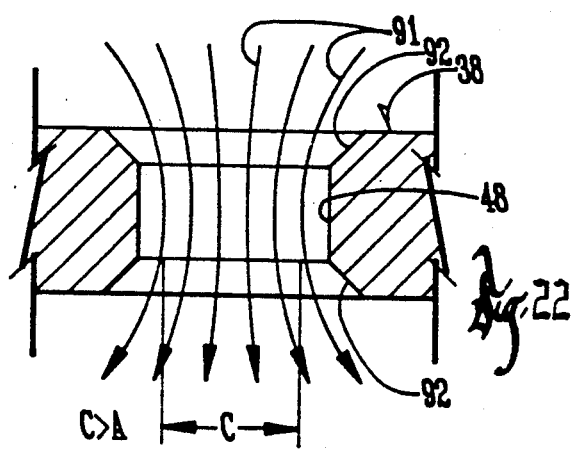

FIGS. 20-22 illustrate, in an enlarged fashion, features according to the preferred embodiment of the present invention regarding apertures or holes 48 in plates 38 or 44. It is preferred that all apertures 48 be shaped so that they are either radiused (see in FIG. 21) or chamfered (FIG. 22), as opposed to having a straight bore (FIG. 20). Such shaping either by radiusing bores 48 (see reference numeral 90, FIG. 21) or chamfering the inlet and outlet of bores 48 (see reference numeral 92 FIG. 22) minimizes losses for gas and liquid flow. Without such shaping (which can also be accomplished by other methods), straight sided bores 48 (FIG. 20) cause vapor bubbles 93 which create flow losses.

Reference numeral 91 shows the general configuration of fluid flow through holes 48. It can be seen that the radiusing or chamfering more closely approximates the shape of fluid flow 91. The straight bore hole 48 at FIG. 20 would cause reduction in capacity, which is improved upon by the shaping of FIGS. 21 and 22 to minimize inlet and outlet losses through holes 48 and increase efficiency for maximum flow.

Spacing of holes 48 is particularly important for reduction of noise for gas flow. The higher the pressure differential across plate 38 or 44, the farther apart holes 48 should be paced to minimize turbulence of the gas when exiting the apertures 48. This in turn reduces noise.

Sizing of the holes is also a consideration in designing the present invention. It is generally best to obtain as small of a hole diameter as possible. However, considerations of cost, manufacturing procedures, and possible side effects of small hole sizes must be taken into account. For example, if the holes are drilled, the smaller the hole generally means an increase in the number of holes for a particular size of plate. This will make the drilling process slower and subjects an increased risk of drill bit breakage or other problems. Additionally, there is a relationship between plate thickness and the smallest bit diameter that can achieve an adequate drilled hole in one pass. In other words, a particular sized hole for a given plate thickness may require more than one drill pass which substantially increases cost of manufacturing.

If the holes are cast, there are other limitations that come into play. Another consideration is that if the holes are very small the plates can act as filters and sometimes can become partially or fully clogged.

Therefore, it is important to consider these matters when designing the size, shape, and spacing of holes 48 for the plates 38 and 44. There parameters generally change for varying applications of the valve, for example, whether liquid or gas is moving through the valve, the size of the valve, and the range of anticipated pressure of the fluid.

In the preferred embodiment of the present invention, it can be seen that plate 44 intersects plate 38. It is to be understood that the angle of intersection can be oblique as shown in the drawings, or can be perpendicular. An important aspect of these intersecting plates is that it contributes to the structural strength and integrity of the insert. This is an important consideration for such valves where pressures and forces can detrimentally affect and damage even metal plates of substantial thicknesses. Plate 44 intersects plate 38 intermediate along the length of the larger plate 38 to contribute to the structural soundness of the preferred embodiment. It is again mentioned that the attachment of plates 38 and 44 together, and to the trim element, can be by a variety of ways, including those shown in the drawings, or alternatively, all connections could be made by the welding, or other means.

It is also to be understood that it would be ideal to be able to attenuate noise or cavitation without any affect on flow capacity. The trim element insert according to the present invention does present some restriction to flow through the valve. However, it is also to be understood that it is generally true in practical applications that valves of this type are used only to a fraction of their total capacity. Sometimes the valves never operate at more than 40 to 45 percent of capacity. Therefore, even if the present invention restricts the flow in the range of 35 percent, for example, it still would not restrict flow to a degree that the valve would have a particularly unsatisfactory flow capacity.

It is again reiterated that the noise and cavitation reduction capabilities of the present invention are extremely effective and that any effect on flow capacity is generally acceptable. Moreover, it is again emphasized that the particular configuration of the preferred embodiment, with its leading edge oblique to the rotational axis of the trim element does not create the type of undesirable flow characteristic shown in FIG. 18, but maintains flow characteristics similar to those in FIG. 17. This is extremely important because many times valves of this type are used in automatic flow control systems. Such systems generally must have a monotonic relationship between percentage of valve opening and percentage of maximum flow through the valve. It should be noted that during the first 50 percent opening of the valve, fluid flow is partitioned at least through one stage. In other words, fluid must pass through apertures 48 in at least one plate. Some of the fluid actually will pass through more than one set of apertures 48. For example, in FIG. 10, some fluid will pass through plate 44 and then through the back of plate 38 so that it is partitioned in two stages which can advantageously impact on noise and cavitation attenuation.

It can therefore be appreciated that the present invention can take many forms and embodiments. The true essence and spirit of this invention are defined in the appended claims, and it is not intended that the embodiment of the invention presented herein should limit the scope thereof.

What is claimed is:

1. An apparatus for insertion into a flow path through a ball-type valve with a trim element having an axis of rotation comprising:
    a first plate with a plurality of spaced apart holes specially shaped, sized, and spaced to maximize efficiency and minimize large scale turbulence in fluid flow through the valve;
    a second plate with a plurality of spaced apart holes specially shaped, sized, and spaced to maximize efficiency and minimize large scale turbulence in fluid flow through the valve;
    the first and second plates intersecting one another; and
    the first and second plates being movably positioned in the flow path so that faces of the first and second plates extend substantially across the flow path between a closed condition and an approximately 50 percent opening condition of the valve, the first plate becoming increasingly parallel while the second plate becomes increasingly transverse to the flow path when the valve moves between approximately 50 percent open and fully open, so that unrestricted fluid flow area is increased between those positions.

2. The apparatus of claim 1 wherein the first plate has a leading edge which is oblique to the axis of rotation of the trim element.

3. The apparatus of claim 1 wherein the ball-type valve is a full-ball valve.

4. The apparatus of claim 1 wherein the ball-type valve is a segmented ball valve.

5. The apparatus of claim 1 wherein the ball-type valve is a restricted ball valve.

6. A noise and cavitation reducing device for mounting in a ball-type trim element for a ball-type valve, where the trim element has an outer convex blocking surface, and the trim element is rotatable about a rotational axis to move the blocking surface between a closed position blocking a flow path through the valve, and a substantially open position allowing flow through the flow path, comprising:
   a first flow partitioning plate means connected to and extending away from an interior face opposite the convex blocking surface of the trim element; and
   the first flow partitioning plate means angularly intersecting a second flow partitioning plate means.

7. The device of claim 6 wherein the first flow partitioning plate means is oriented obliquely to the rotational axis of the trim element.

8. The device of claim 6 wherein the second flow partitioning plate means is substantially perpendicular to the first flow partitioning plate means and generally parallel to the rotational axis of the trim element.

9. The device of claim 6 wherein the second flow partitioning plate means is substantially perpendicular to the first flow partitioning plate means and oblique to the rotational axis of the trim element.

10. A noise and cavitation reduction device for ball-type valves comprising:
   a valve housing having a flow path therethrough between an inlet and an outlet;
   a ball or partial ball means rotationally pivotably about an axis transverse to the flow path between a closed position blocking the flow path and an open position substantially allowing fluid through the flow path;
   a flow partitioning means, mountable to the ball or partial ball means, and having first and second intersecting sections, each of the first and second sections including apertures allowing fluid flow through opposite sides of each section;
   the first section having a leading edge oriented obliquely to the axis; and
   the second station oriented substantially perpendicular to the first section.

11. The noise and cavitation reduction device of claim 10 wherein the area of the first section is larger than the area of the second section.

12. The noise and cavitation reduction device of claim 10 wherein the ratio of area of apertures to surfaces of the first portion is related to the same ratio for the second portion.

13. The noise and cavitation reduction device of claim 10 wherein the second portion intersects the first portion intermediate between opposite ends of the first portion.

14. A ball-type valve exhibiting improved noise and cavitation characteristics comprising:
   a trim element pivotally rotatably around a rotational axis transverse to a flow pathway through the valve, and having an outer surface of which at least a portion is generally spherical in shape, and having an interior cavity for fluid flow between front and back generally along an axis transverse to the rotational axis of the trim element;
   flow partitioning means insertable into the cavity having a first plate means with apertures and a front edge and back edge, the first plate means mounted to the trim means by mounting means to position the first plate means through the cavity so that the front edge of the first plate means is near the front of the cavity and the back edge of the first plate means is near the back of the cavity, and the first plate means is oblique in any direction to the rotational axis; and
   a second plate connected intermediately between the front end back edges of the first plate means and extending from the first plate means through the cavity to the trim element, the second plate having apertures distributed therethrough.

15. A method of diminishing cavitation in a ball-type valve comprising:
   reducing the velocity of fluid flow past a leading edge of a trim element of the ball-type valve by partitioning unobstructed flow area substantially immediately downstream of the leading edge of the trim element where flow characteristic of the valve is maintained by partitioning flow with surfaces which are interposed in the fluid flow through the valve, and two surfaces, in generally intersecting planes to one another, are utilized.

16. The method of claim 15 wherein flow characteristic of the valve is modified by varying the ratio of open areas to surface areas of surfaces used to partition flow through the valve.

17. The method of claim 15 wherein partitioning of unobstructed flow areas is accomplished while increasing flow area with increasing opening of the valve.

18. A method of noise and cavitation control for a ball-type valve while maintaining the desired flow characteristic for the valve comprising:
   completely partitioning flow closely down stream from an inlet to the valve during at least a portion of time the valve is between a closed position and approximately 50 percent open position;
   partially partitioning flow closely down stream from the valve inlet during the other portion of time the valve is between a closed and approximately 50 percent open position; and
   wherein the flow characteristics for the valve are maintained by partitioning flow with surfaces positioned so that incremental movement of the valve results in incremental change in flow area through the valve, and two intersecting surfaces are utilized to partition flow.

19. The method of claim 18 wherein flow area for the flow stream is increased with increasing opening of the flow valve.

20. The method of claim 18 wherein partitioning of flow is accomplished by forcing fluid into a plurality of relatively small openings.

* * * * *